(12) United States Patent
Kumar (10) Patent No.: US 11,198,240 B2
(45) Date of Patent: Dec. 14, 2021

(54) MOLDING MOLD

(71) Applicant: NISSEI ASB MACHINE CO., LTD., Nagano (JP)

(72) Inventor: Upendra Kumar, Maharashtra (IN)

(73) Assignee: NISSEI ASB MACHINE CO., LTD., Nagano (JP)

( * ) Notice: Subject to any disclaimer, the term of this patent is extended or adjusted under 35 U.S.C. 154(b) by 164 days.

(21) Appl. No.: 16/490,313

(22) PCT Filed: Mar. 1, 2018

(86) PCT No.: PCT/JP2018/007720
§ 371 (c)(1),
(2) Date: Aug. 30, 2019

(87) PCT Pub. No.: WO2018/159745
PCT Pub. Date: Sep. 7, 2018

(65) Prior Publication Data
US 2020/0009776 A1 Jan. 9, 2020

(30) Foreign Application Priority Data

Mar. 2, 2017 (JP) .............................. JP2017-039769

(51) Int. Cl.
*B29C 45/73* (2006.01)
*B29C 45/26* (2006.01)
*B29C 49/06* (2006.01)

(52) U.S. Cl.
CPC ...... *B29C 45/7312* (2013.01); *B29C 45/2602* (2013.01); *B29C 49/06* (2013.01)

(58) Field of Classification Search
CPC ............ B29C 45/7312; B29C 45/7207; B29C 45/2602; B29C 2045/7318
See application file for complete search history.

(56) References Cited

U.S. PATENT DOCUMENTS 4,895,293 A * 1/1990 Brown ................ B29C 33/0022
228/161
6,079,972 A 6/2000 Gellert
(Continued)

FOREIGN PATENT DOCUMENTS

| CN | 1340000 | 3/2002 |
|----|---------|--------|
| EP | 0 071 258 A1 | 2/1983 |

(Continued)

OTHER PUBLICATIONS

Office Action issued in Chinese Patent Application No. 201880015289.0 dated Dec. 3, 2020 and English Translation thereof.
(Continued)

*Primary Examiner* — Jacob T Minskey
*Assistant Examiner* — Virak Nguon
(74) *Attorney, Agent, or Firm* — Greenblum & Bernstein, P.L.C.

(57) ABSTRACT

An object of the present application is to allow a first cavity mold and a second cavity mold to become integrated with each other in a state in which the first cavity mold constituting an injection cavity mold is inserted into an insertion hole of the second cavity mold, with a cooling flow path for supplying a cooling medium formed between the first cavity mold and the second cavity mold.

13 Claims, 8 Drawing Sheets

(56) References Cited

U.S. PATENT DOCUMENTS

| | | | |
|---|---|---|---|
| 6,176,700 B1 | 1/2001 | Gellert | |
| 2002/0081347 A1* | 6/2002 | Dubuis | B29C 35/16 |
| | | | 425/547 |
| 2002/0117777 A1 | 8/2002 | Gellert | |
| 2015/0174792 A1* | 6/2015 | Lausenhammer | B29C 45/7312 |
| | | | 264/348 |
| 2015/0360404 A1* | 12/2015 | Kmoch | B29C 45/2675 |
| | | | 425/577 |
| 2018/0050476 A1* | 2/2018 | Kmoch | B29C 45/34 |

FOREIGN PATENT DOCUMENTS

| | | | | |
|---|---|---|---|---|
| EP | 0 990 502 A1 | 4/2000 | | |
| EP | 2 520 403 A1 | 11/2012 | | |
| EP | 2520403 A1 * | 11/2012 | | B29C 33/3828 |
| GB | 1 467 465 | 3/1977 | | |
| GB | 1467465 A * | 3/1977 | | B29C 49/6427 |
| JP | 64-27919 | 1/1989 | | |
| JP | 6-238728 | 8/1994 | | |
| JP | 2002-531297 | 9/2002 | | |
| JP | 2002-537143 | 11/2002 | | |
| JP | 6014874 | 10/2016 | | |

OTHER PUBLICATIONS

Extended European Search Report issued in European Patent Application No. 18761458.1 dated Nov. 13, 2020.

Official Communication issued in International Application No. PCT/JP2018/007720, dated Apr. 24, 2018.

Official Communication issued in Application No. PCT/JP2018/007720, dated Mar. 1, 2018.

Office Action issued in Taiwan Counterpart Patent Appl. No. 107106941, dated Sep. 19, 2018, along with an English translation thereof.

Office Action issued in Taiwan Counterpart Patent Appl. No. 107106941, dated Mar. 15, 2019, along with an English translation thereof.

* cited by examiner

MOLDING MOLD

TECHNICAL FIELD

The present invention relates to a molding mold used for molding a resin material by injection molding, and particularly to a molding mold used for forming a preform.

BACKGROUND ART

In order to give the high market competitiveness to an injection molding apparatus and a blow molding apparatus for molding a resin material, it is necessary to increase a production capacity. In an injection blow molding apparatus or an injection stretch blow molding apparatus, which is called a hot parison type in which the injection molding and blow molding can be performed with one machine, the entire molding cycle time is substantially determined by the time required for injection molding of a preform. Therefore, in order to increase the production capacity, it is important how to reduce the time required for injection molding.

The time required for injection molding of the preform includes the time for filling molten resin from an injection device into a cavity mold (filling time), the time for cooling and solidifying the molten resin in the cavity mold (cooling time), and the time required for removing and transporting the preform (removing and transporting time). Therefore, the time required for injection molding of the preform can be shortened by shortening at least one of the filling time, the cooling time and the take-out and transport time.

While shortening the filling time and the removing and transporting time often involves significant modification or changes to the apparatus, shortening the cooling time can be relatively easily performed just by modifications or changes to a mold.

Here, in a molding mold of an injection molding apparatus, for example, a cavity mold is cooled by circulating a cooling medium such as cooling water through a cooling flow path (cooling circuit) provided in the cavity mold, thereby cooling the resin material (molten resin) filled in the cavity mold.

The cavity mold provided with the cooling flow path has various structures. For example, there is a structure in which the cavity mold is composed of two molds and the cooling flow path is formed between the two molds. Specifically, there is a structure in which a plurality of grooves are provided around an outer peripheral surface of a cavity body which is one mold, and the cooling flow path (water pipe circuit) is formed by closing opening surfaces of the grooves with another mold arranged outside the cavity body (see PTL 1).

In the configuration where the cooling flow path is formed between two molds in this manner, the cooling efficiency of the resin material can be increased by relatively reducing the thickness of the cavity mold between the cavity that is a space filled with the resin material and the cooling flow path (groove) and by becoming the cooling flow path closer to the cavity. As a result, the total time required for injection molding of the preform can be shortened.

Further, there is a cavity mold provided with the cooling flow path, for example, manufactured by diffusion bonding method (see PTL 2).

The diffusion bonding is a method in which a groove for a cooling flow path is formed on a plurality of metal plates, and these metal plates are integrated by thermo-compression bonding, for example. Compared with a general method of forming a cooling flow path by cutting a mold, the diffusion bonding is capable of forming a cooling flow path having a complicated shape. For example, a ring-shaped cooling flow path that follows the sectional shape of the preform can be formed in the vicinity and at a uniform position from the inner wall surface (product surface or cavity surface) of the mold, so that the cooling efficiency is increased. Further, since the mold is a monolithic body, the mold has a structure that is strong against the filling pressure of the molten resin and the injection mold-clamping force.

CITATION LIST

Patent Literature

[PTL 1] Japanese Patent No. 6014874
[PTL 2] JP-A-Hei-01-027919

SUMMARY OF INVENTION

Technical Problem

However, in the molding mold described in PTL 1, a neck mold (neck ring) comes into contact with a cavity mold (cavity body) when the molding mold is mold clamped. Therefore, in order to desirably mold clamp the molding mold including the cavity mold, a very large injection mold-clamping force is applied to the cavity mold. Thus, the cavity mold needs to ensure high rigidity. That is, there is a problem that the cooling efficiency cannot be increased by reducing the thickness of the cavity mold.

Further, in the molding mold described in PTL 2, since a special processing tool is required and it takes time to manufacture, there is a disadvantage that the manufacturing cost is high.

The present invention has been made in view of such circumstances and aims to provide a molding mold which can be desirably mold clamped and which is capable of increasing the cooling efficiency.

Solution to Problem

One aspect of the disclosure for solving the above problems provides a molding mold for injection molding of a preform. The molding mold includes an injection cavity mold configured to form an outer surface of a body part of the preform and an outer surface of a bottom part of the preform, in which the injection cavity mold includes a first cavity mold in which a cavity that is a space configured to be filled with a resin material is formed, and a cylindrical second cavity mold having an insertion hole at a center thereof, and in which the first cavity mold and the second cavity mold are integrated in a state where the first cavity mold is inserted into the insertion hole, and a cooling flow path to which a cooling medium is configured to be supplied is formed between the first cavity mold and the second cavity mold.

In such a molding mold according to the disclosure, since the cavity mold is composed of the first cavity mold and the second cavity mold, the first cavity mold and the second cavity mold can be functionally separated. Further, since the injection mold-clamping force is not transmitted to the first cavity mold, the thickness of the first cavity mold can be reduced to improve the cooling efficiency of the resin material.

Further, since the cooling flow path is formed between the first cavity mold and the second cavity mold, the cleaning of the cooling flow path, for example, can be also performed by separating the first cavity mold and the second cavity mold, and the maintainability is improved.

Here, it is preferable that the molding mold further includes a neck mold configured to form an outer surface of a neck part of the preform, and when the molding mold is mold clamped, the injection cavity mold is configured to be positioned with respect to the neck mold in a mold-clamping direction by the neck mold coming into contact with the second cavity mold. In this way, when the molding mold is mold clamped, the neck mold is positioned by coming into contact with the second cavity mold and does not substantially contact with the first cavity mold. That is, the injection mold-clamping force is transmitted to the second cavity mold and is not substantially transmitted to the first cavity mold.

Further, it is preferable that when the molding mold is mold clamped, a gap is formed between the neck mold and the first cavity mold in a state where the neck mold is in contact with the second cavity mold. In this way, the input of the injection mold-clamping force to the first cavity mold is more reliably suppressed. Meanwhile, the gap used herein is a minute gap that does not allow the resin material to flow out, for example, a minute gap of about several µm to several tens of µm.

Further, it is preferable that a plurality of annular outer flange portions protruding outward are provided, at a predetermined interval, on an outer peripheral surface of the first cavity mold, a plurality of annular inner flange portions protruding inward are provided, at a predetermined interval, on an inner peripheral surface of the second cavity mold, the first cavity mold and the second cavity mold are integrated in a state where the inner flange portions and the outer flange portions are in contact with each other, and a plurality of annular flow paths, which are partitioned by the outer flange portions and the inner flange portions and form the cooling flow path, are formed between the first cavity mold and the second cavity mold. In this way, the depth of the cooling flow path (groove) formed in the first cavity mold and the second cavity mold becomes shallow. Therefore, the processing for the mold can become easy, and the maintainability can be further improved.

Further, it is preferable that the second cavity mold is configured by a plurality of members stacked in a mold-clamping direction and is divided at at least a position corresponding to an uppermost portion of the annular flow paths. Furthermore, it is preferable that the second cavity mold is divided at positions respectively corresponding to the plurality of annular flow paths.

With such a configuration, the second cavity mold can be relatively easily formed, so that the maintainability can be improved and the manufacturing cost can be reduced.

Advantageous Effects of Invention

As described above, according to the molding mold of the present invention, the cooling efficiency of the resin material can be improved, and the time required for injection molding can be shortened. As a result, the entire molding cycle time in the injection blow molding apparatus, for example, can be shortened, and the productivity can be improved.

DESCRIPTION OF EMBODIMENTS

Hereinafter, an embodiment of the present invention will be described in detail with reference to the drawings.

Figure 1:
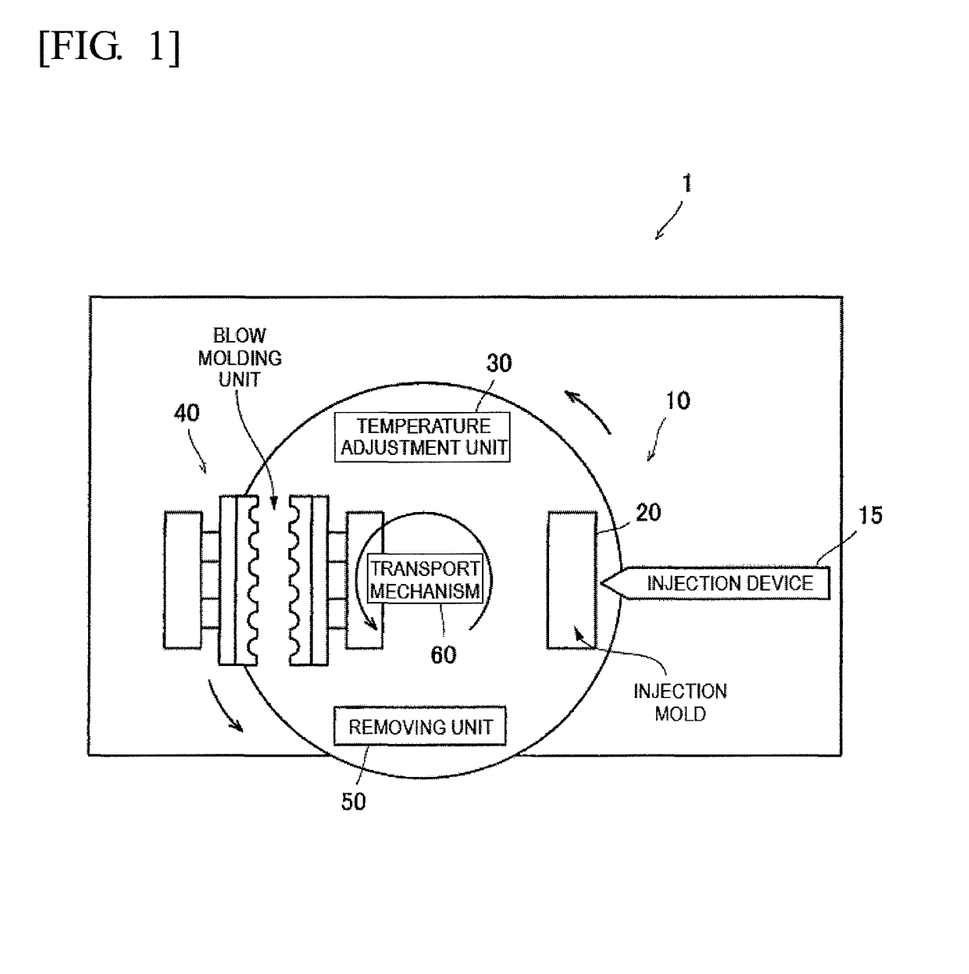
FIG. 1 is a plan view showing an injection blow molding apparatus provided with a molding mold according to the present invention.

First, referring to FIG. 1, the whole configuration of an injection blow molding apparatus 1 provided with a molding mold according to the present invention will be briefly described.

The injection blow molding apparatus 1 is an apparatus for manufacturing a resin container. The injection blow molding apparatus 1 includes an injection molding unit 10 for forming a preform, a temperature adjustment unit 30 for adjusting the temperature of the formed preform, a blow molding unit 40 for blow-molding the preform into a container, and a removing unit 50 for removing a formed container. Thus, the injection blow molding apparatus 1 has a configuration called a hot parison type or a one-stage type as a whole.

The injection molding unit 10, the temperature adjustment unit 30, the blow molding unit 40 and the removing unit 50 are respectively provided at positions rotated at a predetermined angle (90 degrees in the present embodiment) in the horizontal direction about a transport mechanism 60. The transport mechanism 60 includes the same number of transfer plates as the processing units including the injection molding unit 10, the temperature adjustment unit 30, the blow molding unit 40 and the removing unit 50. For example, in the present embodiment, four transfer plates are arranged at intervals of 90 degrees in a plan view (not shown). The transport mechanism 60 intermittently rotates these transfer plates and arranges them in each processing unit.

Further, in the present embodiment, the injection molding unit 10 constituting the injection blow molding apparatus 1 includes an injection device 15 for injecting a resin material and an injection mold (molding mold) 20 according to the present invention.

Subsequently, the schematic configuration of the injection molding unit 10 will be described with reference to FIG. 2.

Figure 2:
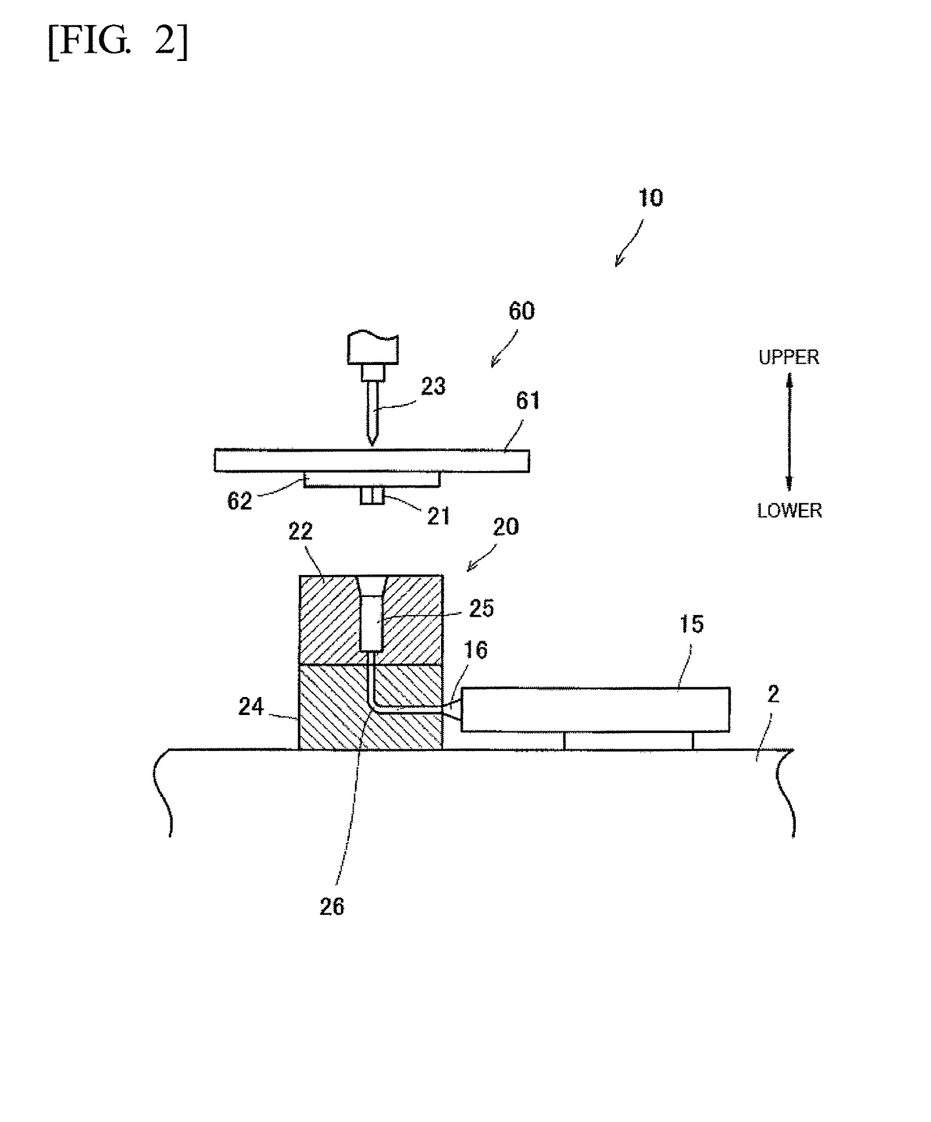
FIG. 2 is a side view showing the injection blow molding apparatus provided with the molding mold according to the present invention.

As shown in FIG. 2, the injection device 15 and the injection mold 20 are provided to a machine table 2. The injection mold 20 includes a pair of neck molds 21 for forming a mouth portion (neck portion) of a preform (not shown), an injection cavity mold 22 for forming an outer shape of a body of the preform, and a core mold 23 for forming an inner shape of the preform. A cavity 25 is formed in the injection cavity mold 22. The cavity 25 is a space filled with a resin material supplied from the injection device 15. Further, the injection cavity mold 22 is fixed to the machine table 2 via a hot runner block 24.

The neck mold (a pair of neck split molds) 21 is held by a fixed plate part 62 of a transfer plate 61 constituting the transport mechanism 60. A preform formed by the injection molding unit 10 is supported by the neck mold (a pair of neck split molds) 21 at the mouth portion and transported to the temperature adjustment unit 30 by the transfer plate 61 of the transport mechanism 60.

The core mold 23 is provided to be movable up and down with respect to the transfer plate 61. When the preform is formed by injection molding, the core mold 23 is lowered and disposed within the cavity 25 of the injection cavity mold 22 through a hole portion (not shown) formed in the transfer plate 61.

The hot runner block 24 has a flow path 26 for guiding molten resin into the cavity 25. A nozzle 16 of the injection device 15 for discharging the resin is connected to one end side of the flow path 26. Another end side of the flow path 26 communicates with the cavity 25 of the injection cavity mold 22. The molten resin supplied from the nozzle 16 of the injection device 15 is guided into the cavity 25 of the clamped injection mold 20 through the flow path 26.

Subsequently, the structure of the injection mold 20, in particular, the structure of the cavity mold will be described in more detail with reference to FIGS. 3 to 5.

Figure 3:
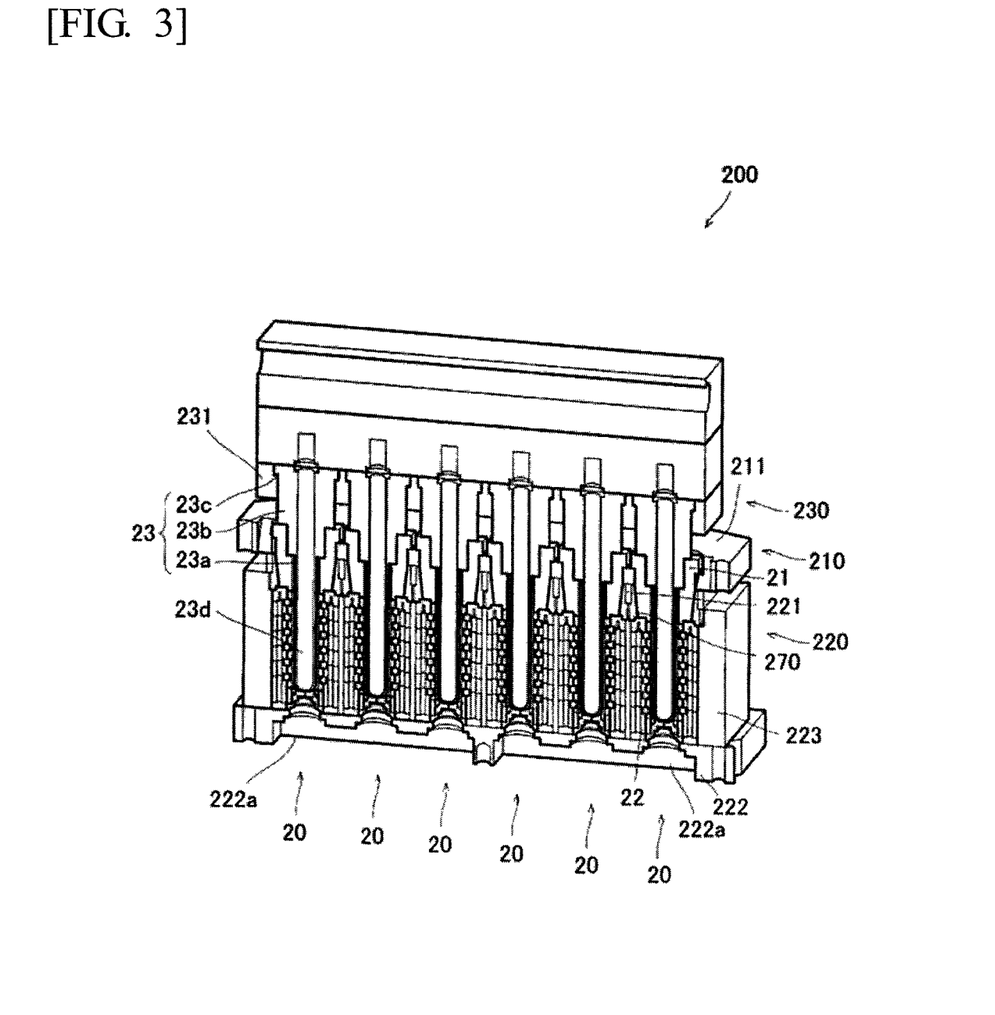
FIG. 3 is a view showing an injection mold unit provided with the molding mold according to the present invention.

FIG. 3 is a schematic view showing the whole configuration (in the mold-clamped state) of the injection mold unit according to the present invention. FIG. 4 is a sectional view of the injection mold. FIG. 5 is a sectional view showing a first cavity mold and a second cavity mold.

As shown in FIG. 3, a plurality of injection molds 20 is integrated to form an injection mold unit 200. That is, the injection mold unit 200 includes a neck mold unit 210 including a plurality of neck molds 21 respectively constituting the injection molds 20, an injection cavity mold unit 220 including a plurality of injection cavity molds 22, and a core mold unit 230 including a plurality of core molds 23.

The core mold unit 230 includes a plurality of core molds 23 (e.g., six core molds) and a core mold fixing plate 231 to which the plurality of core molds 23 are fixed. That is, the plurality of core molds 23 respectively constituting the injection molds 20 are fixed to and integrated with a single core mold fixing plate 231.

Figure 4:
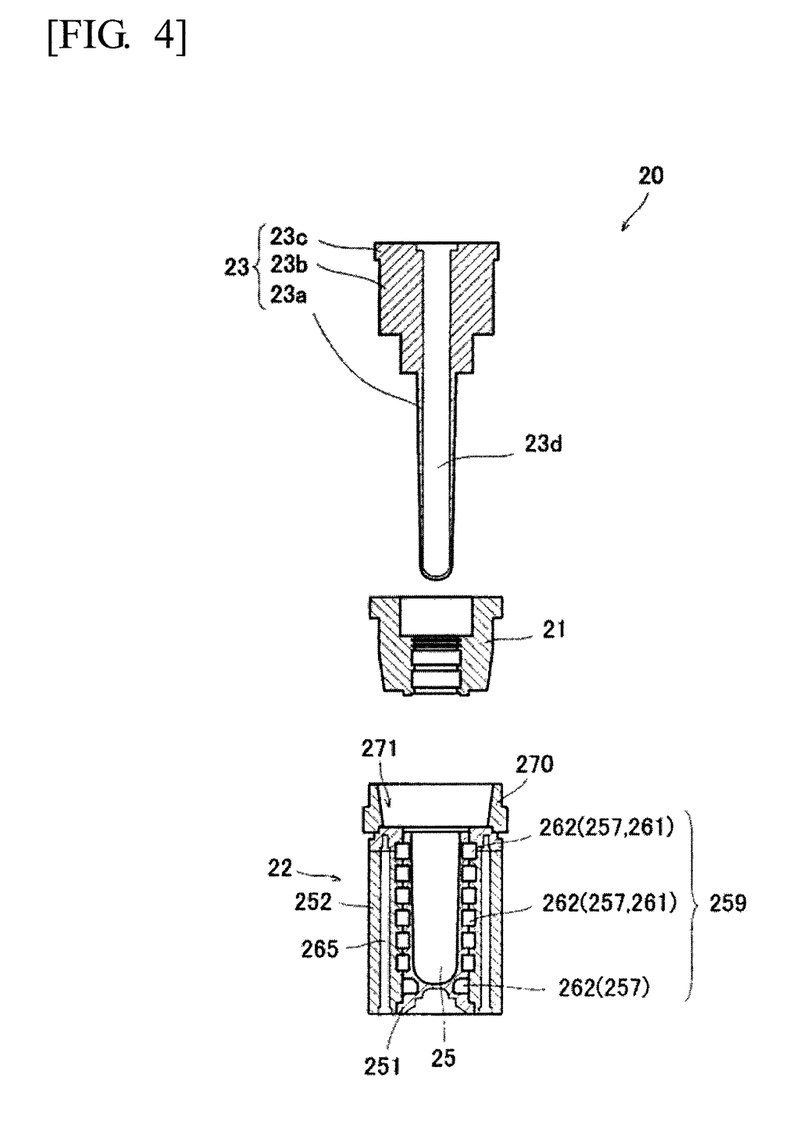
FIG. 4 is a sectional view showing the molding mold according to the present invention.

Meanwhile, as shown in FIGS. 3 and 4, the core mold 23 is formed in a substantially cylindrical shape. The core mold 23 includes a rod-shaped portion 23a defining an inner peripheral surface of the preform, a stepped portion 23b that comes into contact with an upper surface of the neck mold 21, and a flange portion 23c fixed to the fixing plate. Further, a cylindrical space 23d is provided at the center of the core mold 23. A jacket (not shown) for cooling medium circulation is inserted into the space 23d. On the outer periphery of the jacket, spiral fins are provided to extend in the vertical direction. The spiral fins are combined with the cylindrical space of the core mold 23 to form a cooling flow path (cooling circuit) in which a cooling medium such as cooling water is circulated.

The neck mold unit 210 is configured by a plurality of neck molds (a pair of split molds) 21 and a neck mold fixing plate 211 for supporting the plurality of neck molds 21. That is, the plurality of neck molds 21 respectively constituting the injection molds 20 are fixed to and integrated with the neck mold fixing plate 211.

As described above, the neck mold 21 is composed of a pair of split molds. Therefore, although not shown, the neck mold fixing plate 211 also includes a pair of neck mold fixing plates (a first neck mold fixing plate and a second neck mold fixing plate) to which the split mods are fixed respectively. The first neck mold fixing plate and the second neck fixing plate are connected to each other by a tension spring. In a normal state, the first neck mold fixing plate and the second neck fixing plate are in contact with each other to maintain a mold closed state. Further, the first neck mold fixing plate and the second neck mold fixing plate are mold opened by inserting wedge-shaped cam members into cam grooves provided at both side portions of the neck mold fixing plate.

Further, although not shown in FIG. 3, the transfer plate 61 (see FIG. 2) is located between the core mold fixing plate 231 and the neck mold fixing plate 211, and the neck mold fixing plate 211 is supported on the transfer plate 61 slidably in the horizontal direction.

The injection cavity mold unit 220 includes an upper fixing plate 221, a lower fixing plate 222 and a cavity mold fixing block 223. The plurality of injection cavity molds 22 respectively constituting the injection molds 20 are integrated by the upper fixing plate 221, the lower fixing plate 222 and the cavity mold fixing block 223.

The cavity mold fixing block 223 is provided with a plurality of vertical holes extending in the vertical direction. The injection cavity molds 22 are accommodated in the vertical holes, respectively. Further, for example, first lateral holes extending in the horizontal direction are provided at two positions of the cavity mold fixing block 223 above and below the vertical holes. The first lateral holes penetrate to the outer surface of the cavity mold fixing block 223. In addition, a cooling medium such as cooling water is supplied to a cooling flow path (cooling circuit) to be described later through the first lateral holes.

Further, the lower fixing plate 222 is provided with a connection recess 222a. A nozzle (not shown) of the hot runner block 24 is inserted into the connection recess 222a and connected to each of the injection cavity molds 22. In addition, the molten resin supplied through the nozzle of the hot runner block 24 connected to the connection recess 222a can be introduced into the injection cavity mold 22.

Figure 5:
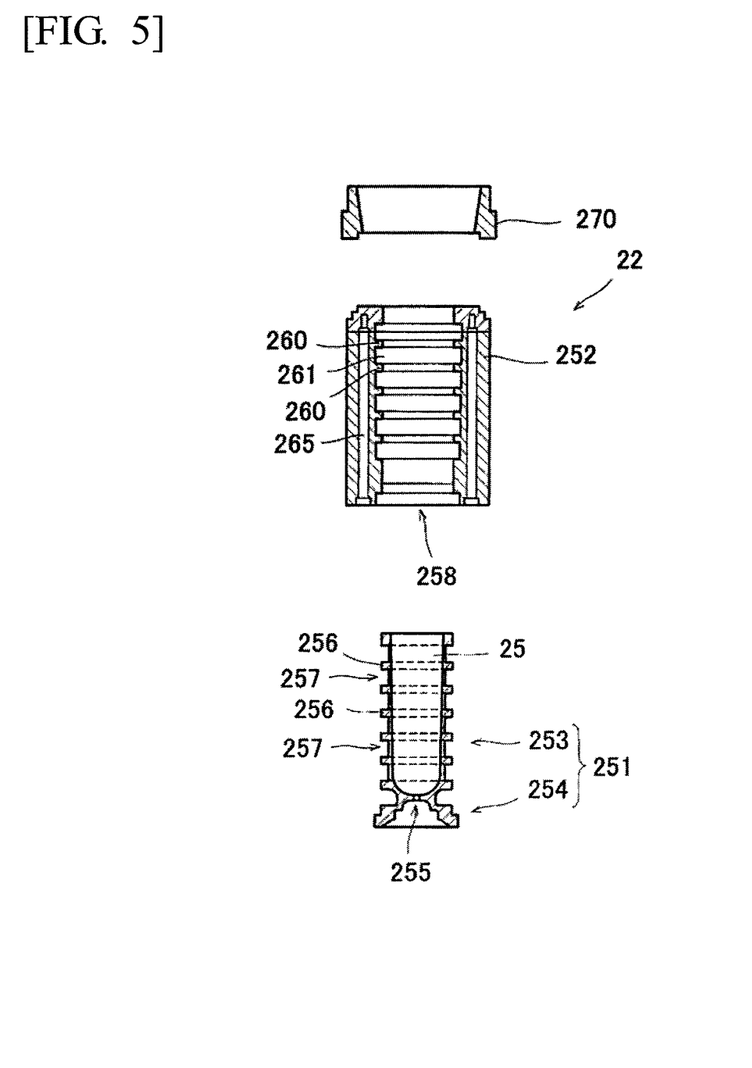
FIG. 5 is a sectional view showing an injection cavity mold according to the present invention.

Further, as shown in FIGS. 4 and 5, the injection cavity mold 22 according to the present embodiment includes a first cavity mold 251 in which the cavity 25 that is a space configured to be filled with a resin material is formed, and a cylindrical second cavity mold 252 disposed to surround the first cavity mold 251.

The first cavity mold 251 includes a cavity portion 253 and a flange portion 254 provided below the cavity portion 253 and having a diameter larger than the cavity portion 253. Further, the cavity 25 that is a space configured to be filled with the resin material is formed in the cavity portion 253. The flange portion 254 is provided with a gate portion 255 to which the nozzle of the hot runner block 24 is connected.

Here, the thickness of the cavity portion 253, that is, the thickness of a peripheral wall of the cavity 25 is formed to be substantially constant in an upper and lower direction (mold-clamping direction). Furthermore, on the outer peripheral surface of the cavity portion 253, a plurality of annular outer flange portions 256 are formed at a substantially equal interval along the upper and lower direction (mold-clamping direction). As a result, an annular groove portion 257 are formed between the outer flange portions 256, respectively. That is, on the outer peripheral surface of the cavity portion 253, a plurality of annular groove portions 257 are formed at the substantially equal interval along the upper and lower direction.

On the other hand, an insertion hole 258 into which the first cavity mold 251 is inserted from below is formed at a center of the second cavity mold 252. The second cavity mold 252 is formed in a substantially cylindrical shape as a whole. The first cavity mold 251 is integrated with the second cavity mold 252 in a state where the first cavity mold 251 is inserted into the insertion hole 258. Although details are described later, a cooling flow path 259 to which a cooling medium is configured to be supplied is formed between the first cavity mold 251 and the second cavity mold 252.

Further, on the inner peripheral surface of the second cavity mold 252, a plurality of annular inner flange portions 260 are formed at a substantially equal interval along the upper and lower direction (mold-clamping direction). As a result, an annular groove portion 261 is formed between the inner flange portions 260, respectively. That is, on the inner peripheral surface of the second cavity mold 252, a plurality of annular groove portions 261 are formed at the substantially equal interval along the upper and lower direction.

In addition, when the first cavity mold 251 is inserted into the insertion hole 258 of the second cavity mold 252, the outer flange portions 256 of the first cavity mold 251 and the inner flange portions 260 of the second cavity mold 252 come into contact with each other. In this state, the first cavity mold 251 and the second cavity mold 252 are integrated. As a result, a plurality of annular flow paths 262 are formed between the first cavity mold 251 and the second cavity mold 252. The plurality of annular flow paths 262 are partitioned by the outer flange portions 256 and the inner flange portions 260 and constitute the cooling flow path 259 (see FIG. 4). That is, the annular flow paths 262 are formed by the groove portions 257 of the first cavity mold 251 and the groove portions 261 of the second cavity mold 252. Meanwhile, in the present embodiment, the annular flow path 262 formed at the lowermost portion is partitioned from the adjacent annular flow path 262 only by the outer flange portion 256 of the first cavity mold 251.

Further, a vertical hole for communicating the adjacent annular flow paths 262 is formed in the outer flange portions 256 and the inner flange portions 260. Preferably, each annular flow path 262 is configured such that a baffle plate is inserted in each annular flow path 262 to block the flow path and the vertical hole is provided close to the baffle plate.

Further, second lateral holes communicating with the first lateral holes are formed at two upper and lower positions of the second cavity mold 252 for supplying a cooling medium formed in the cavity mold fixing block 223. For example, the cooling medium is introduced into the lowermost annular flow path 262 through the second lateral hole formed on the lower side of the second cavity mold 252, passes around the first cavity mold 251, and then, is discharged from the uppermost annular flow path 262 to the outside through the second lateral hole formed on the upper side of the second cavity mold 252.

Figure 6:
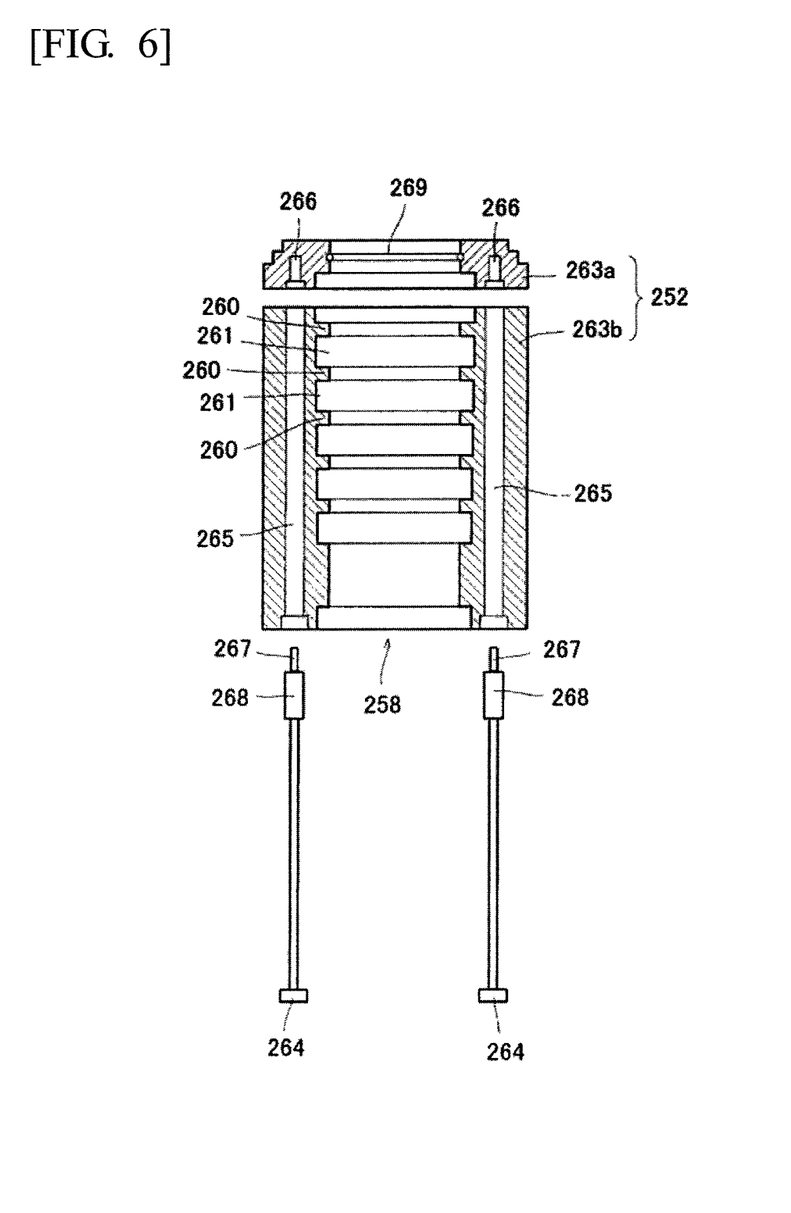
FIG. 6 is a sectional view showing a second cavity mold according to the present invention.

Further, in the present embodiment, the second cavity mold 252 is formed by stacking and integrating a plurality of ring-shaped members 263 in the upper and lower direction (mold-clamping direction). For example, as shown in FIG. 6, the second cavity mold 252 is formed by integrating two ring-shaped members 263a, 263b. In other words, the second cavity mold 252 is divided into two ring-shaped members 263a, 263b.

In the present embodiment, the two ring-shaped members 263a, 263b are integrated by a pin 264. A plurality of screw holes 265 (e.g., two screw holes) having a depth reaching the ring-shaped member 263a from the ring-shaped member 263b are provided around the insertion hole 258 of the second cavity mold 252. A female threaded portion 266 is formed on the portion of each of screw holes 265 (the bottom portion of each of screw holes 265) corresponding to the ring-shaped member 263a.

Here, the pin 264 is configured such that a male threaded portion 267 is formed at a leading end portion of the pin 264 and a positioning portion 268 is formed at a position corresponding to a boundary portion between the ring-shaped members 263a, 263b when the pin 264 is inserted into the screw hole 265. That is, the positioning portion 268 is formed continuously over the two ring-shaped members 263a, 263b.

In addition, the ring-shaped members 263a, 263b are integrated by inserting and fastening the pin 264 with the screw hole 265. The positioning portion 268 of the pin 264 is a portion whose outer diameter is formed with high accuracy in accordance with the inner diameter of the screw hole 265 in order to position the ring-shaped members 263a, 263b.

Further, the position where the second cavity mold 252 is divided is not particularly limited. However, this position is preferably a position corresponding to any one of the groove portions 261, that is, a position located between the inner flange portions 260. In particular, the position is preferably is a position corresponding to the groove portion 261 located on the uppermost portion.

For example, in the present embodiment, a seal member 269 such as an O-ring is mounted between an upper end (the ring-shaped member 263a) of the second cavity mold 252 and the first cavity mold 251 so as to prevent the leakage of the cooling medium flowing through the cooling flow path 259. Therefore, there is a possibility that the seal member 269 may be damaged due to the contact of the first cavity mold 251 when the first cavity mold 251 is inserted into the insertion hole 258 of the second cavity mold 252. However, when the second cavity mold 252 is divided at the position corresponding to the uppermost groove portion 261 and the seal member 269 is mounted to the upper ring-shaped member 263a as in the present embodiment, the damage of the seal member 269 as described above can be suppressed.

Furthermore, the injection cavity mold 22 includes a neck mold contact cavity mold 270 provided to the upper portion of the second cavity mold 252. The neck mold contact cavity mold 270 is a cylindrical member provided to the upper portion of the second cavity mold 252 and forms an engagement concave portion 271 on the upper side of the injection cavity mold 22. The neck mold 21, which lowers when the molding mold is mold clamped, is engaged with the engagement concave portion 271. That is, the neck mold 21 is engaged with the engagement concave portion 271 when the molding mold is mold clamped, so that the neck mold 21 and the injection cavity mold 22 are mold clamped.

Here, when the molding mold is mold clamped, the injection cavity mold 22 is configured to be positioned with respect to the neck mold 21 in the mold-clamping direction by the neck mold 21 coming into contact with the second cavity mold 252. Specifically, as shown in the enlarged view of FIG. 7, the end surface of the second cavity mold 252 on the side of the neck mold 21 is located on the outer side of the first cavity mold 251 (on the side of the neck mold 21). In other words, a concave portion 272 in which the end surface of the first cavity mold 251 is a bottom is formed at the center of the upper surface of the injection cavity mold 22.

Figure 7:
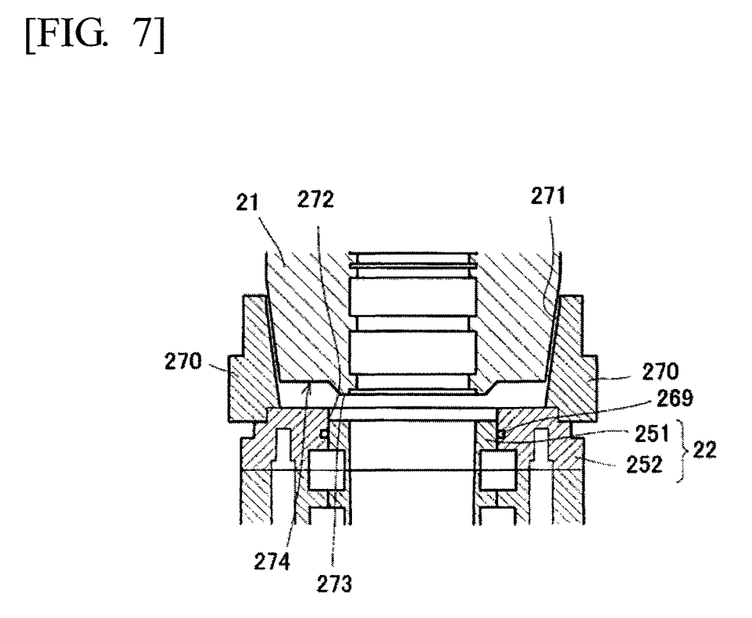
FIG. 7 is an enlarged view of the molding mold according to the present invention.

On the other hand, on the end surface of the neck mold 21 on the side of the injection cavity mold 22, a convex portion 273 protruding toward the injection cavity mold 22 is formed at a position facing the concave portion 272, and a flat portion 274 is formed around the convex portion 273.

That is, when the neck mold 21 is lowered, the flat portion 274 comes into contact with the second cavity mold 252, and the convex portion 273 is engaged with the concave portion 272. Here, the height of the convex portion 273 is formed slightly smaller than the depth of the concave portion 272.

Therefore, when the molding mold is mold clamped, the flat portion 274 around the convex portion 273 is in contact with the second cavity mold 252, but the neck mold 21 and the first cavity mold 251 are not substantially in contact with each other, and a minute gap is formed therebetween. That is, a large injection mold-clamping force, which is applied when the molding mold is mold clamped, is transmitted to the second cavity mold 252 and is not substantially transmitted to the first cavity mold 251.

More specifically, since the neck mold 21 is positioned by the flat portion 274 coming into contact with the upper surface of the second cavity mold 252, most of the injection mold-clamping force from the core mold unit 230 is transmitted to the second cavity mold 252 via the neck mold 21. That is, since the second cavity mold 252 with high mechanical strength receives the injection mold-clamping force, the transmission of the injection mold-clamping force to the first cavity mold 251 is suppressed. Therefore, the load applied to the first cavity mold 251 is significantly reduced. Further, the strength of the first cavity mold 251 may be sufficient to withstand the resin filling pressure weaker than the injection mold-clamping force. In other words, the function of cooling the preform is dedicated to the first cavity mold 251, and the function of receiving the injection mold-clamping force is dedicated to the second cavity mold 252. Two functions required in the injection cavity mold 22 are separated and carried by separate members. In this way, the thickness of the first cavity mold 251 (in particular, the cavity portion 253) can be reduced.

As a result, the cooling flow path 259 can be arranged closer to the inner surface of the first cavity mold 251, so that the cooling strength (heat exchange efficiency and temperature followability) for the molten resin can be improved and cooling time can be shortened.

Further, since the injection cavity mold 22 is composed of the first cavity mold 251 and the second cavity mold 252 which are separable, maintainability is also good. For example, in the case where the injection cavity mold (molding mold) is manufactured by diffusion bonding method, it is difficult to clean scales or the like accumulated in the cooling flow path. However, in the present invention, the cooling flow path 259 can be relatively easily cleaned by separating the first cavity mold 251 and the second cavity mold 252.

Furthermore, since the injection cavity mold 22 is composed of the first cavity mold 251 and the second cavity mold 252 which are separable, the injection cavity mold 22 can be manufactured without requiring a specific processing tool utilized, for example, in diffusion bonding method, and the manufacturing time does not become long. In this way, an effect of suppressing the manufacturing cost can be also obtained.

Meanwhile, since the first cavity mold 251 is thinner than the conventional one, it is desirable to form the first cavity mold 251 with a high strength material. Therefore, stainless steel having higher durability (hardness) than pre-hardened steel used in a general mold may be used although thermal conductivity of the stainless steel is slightly lower than that of pre-hardened steel. Since the stainless steel has better corrosion resistance than the pre-hardened steel, the frequency of the maintenance work can be also reduced. Further, when the cooling strength is excessively high, molding failure such as whitening may occur in the preform. When the stainless steel is used, it is possible to suppress the molding failure while improving strength.

Although the embodiment of the present invention has been described above, of course, the present invention is not limited to the above-described embodiment. The present invention can be modified as appropriate without departing from the spirit of the present invention.

Figure 8:
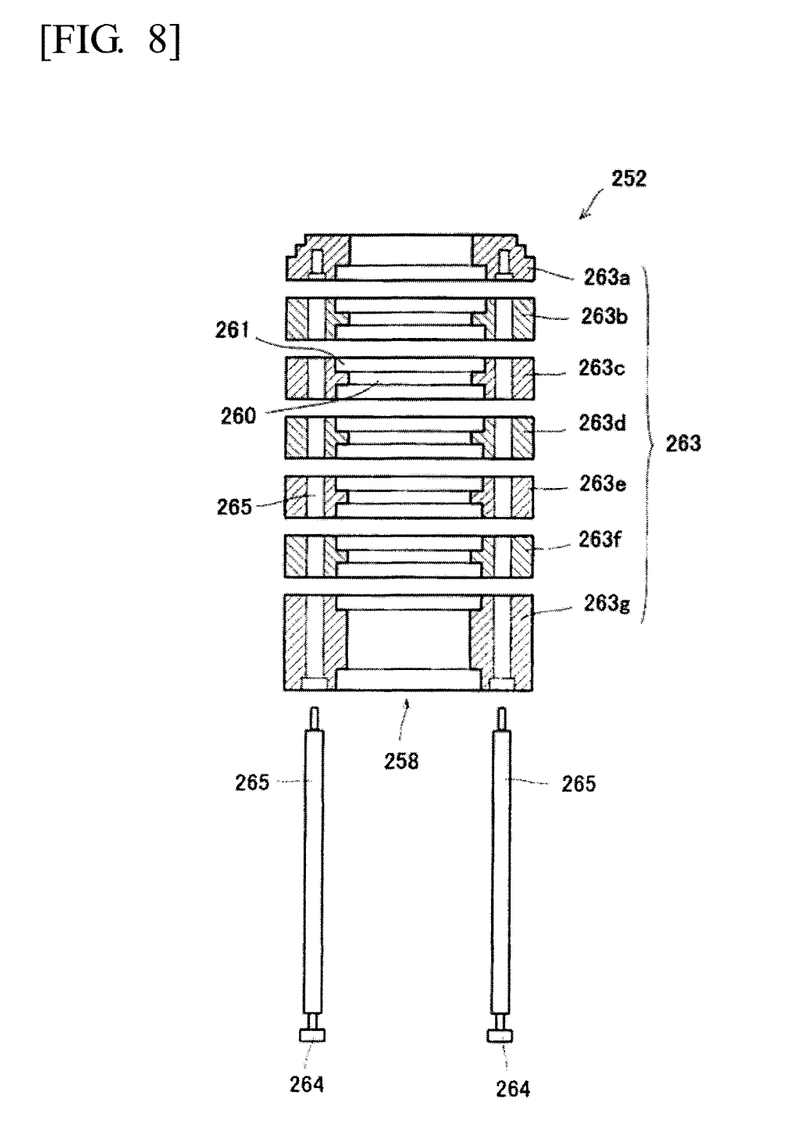
FIG. 8 is a sectional view showing a modification of the second cavity mold according to the present invention.

For example, although the second cavity mold 252 is composed of two ring-shaped members 263a, 263b in the above-described embodiment, the number of the ring-shaped members is not particularly limited. For example, as shown in FIG. 8, the second cavity mold 252 may be divided at portions corresponding to respective groove portions 261. That is, the second cavity mold 252 may be formed by stacking and integrating a plurality of ring-shaped members (e.g., seven ring-shaped members) 263 (263a to 263g) each having the convex portion 273.

Thus, when each of the ring-shaped members 263 constituting the second cavity mold 252 is configured to have one convex portion 273, there is no undercut shape and processing itself becomes easy. Further, the assembly of the second cavity mold 252 can be also made by a simple work in which the ring-shaped members 263 in a state of being stacked on the outside of the first cavity mold 251 are fixed by the pin 264, and there is no need for a special processing tool for bonding. Therefore, the manufacturing cost can be suppressed. Meanwhile, in the case of this configuration, the positioning portion 268 of the pin 264 is preferably formed with a length corresponding to the seven ring-shaped members 263.

Further, in the above-described embodiment, the present invention has been described by taking the injection molding mold as an example. However, for example, the molding mold according to the present invention may be used as a preliminary blow molding mold for the temperature adjustment process. In this case, a temperature adjustment medium is introduced into the above-described cooling flow path (temperature adjustment flow path).

Thus, by using the molding mold according to the present invention as a preliminary blow molding mold, the heat exchange efficiency between the preform contact resin and the temperature adjustment medium can be improved, and an operational effect of improving the productivity, molding quality and energy efficiency can be obtained.

REFERENCE SIGNS LIST

1 Injection Blow Molding Apparatus, 2 Machine Table, 10 Injection Molding Unit, 15 Injection Device, 16 Nozzle, 20 Injection Mold, 21 Neck Mold, 22 Injection Cavity Mold, 23 Core Mold, 24 Hot Runner Block, 25 Cavity, 26 Flow Path, 30 Temperature Adjustment Unit, 40 Blow Molding Unit, 50 Removing Unit, 60 Transport Mechanism, 61 Transfer Plate, 62 Fixed Plate Part, 200 Injection Mold Unit, 210 Neck Mold Unit, 211 Neck Mold Fixing Plate, 220 Injection Cavity Mold Unit, 221 Upper Fixing Plate, 222 Lower Fixing Plate, 223 Cavity Mold Fixing Block, 230 Core Mold Unit, 231 Core Mold Fixing Plate, 251 First Cavity Mold, 252 Second Cavity Mold, 253 Cavity Portion, 254 Flange Portion, 255 Gate Portion, 256 Outer Flange Portion, 257 and 261 Groove Portion, 258 Insertion Hole, 259 Cooling Flow Path, 260 Inner Flange Portion, 262 Annular Flow Path, 263 Ring-shaped Member, 264 Pin, 265 Screw Hole, 268 Positioning Portion, 269 Seal Member, 270

Neck Mold Contact Cavity Mold, 271 Engagement Concave Portion, 272 Concave Portion, 273 Convex Portion, 274 Flat Portion

The invention claimed is:

1. A molding mold for injection molding of a preform, the molding mold comprising:
    an injection cavity mold configured to form an outer surface of a body part of the preform and an outer surface of a bottom part of the preform,
    wherein the injection cavity mold includes
        a first cavity mold in which a cavity that is a space configured to be filled with a resin material is formed, and
        a cylindrical second cavity mold having an insertion hole at a center thereof, and
    wherein the first cavity mold and the second cavity mold are integrated in a state where the first cavity mold is inserted into the insertion hole, and a cooling flow path to which a cooling medium is configured to be supplied is formed between the first cavity mold and the second cavity mold,
    wherein a plurality of annular outer flange portions protruding outward are provided, at a predetermined interval, on an outer peripheral surface of the first cavity mold,
    wherein a plurality of annular inner flange portions protruding inward are provided, at a predetermined interval, on an inner peripheral surface of the second cavity mold, and
    wherein the first cavity mold contacts the second cavity mold to define a plurality of annular flow paths that form the cooling flow path and are formed between the first cavity mold and the second cavity mold.

2. The molding mold according to claim 1, further comprising a neck mold configured to form an outer surface of a neck part of the preform,
    wherein, when the molding mold is mold clamped, the injection cavity mold is configured to be positioned with respect to the neck mold in a mold-clamping direction by the neck mold coming into contact with the second cavity mold.

3. The molding mold according to claim 2,
    wherein, when the molding mold is mold clamped, a gap is formed between the neck mold and the first cavity mold in a state where the neck mold is in contact with the second cavity mold.

4. The molding mold according to claim 1,
    wherein the second cavity mold is configured by a plurality of members stacked in a mold-clamping direction and is divided at at least a position corresponding to an uppermost portion of the annular flow paths.

5. The molding mold according to claim 4,
    wherein the second cavity mold is divided at positions respectively corresponding to the plurality of annular flow paths.

6. The molding mold according to claim 5,
    wherein the second cavity mold is divided at positions between adjacent annular inner flange portions defining the plurality of annular flow paths.

7. The molding mold according to claim 4,
    wherein the second cavity mold is divided at at least a position between adjacent annular inner flange portions defining the uppermost portion of the annular flow paths.

8. The molding mold according to claim 4, further comprising:
    a neck mold configured to form an outer surface of a neck part of the preform; and
    a neck mold contact cavity mold engaged with the neck mold, the neck mold contact cavity mold being provided on an upper portion of the second cavity, which is configured by the plurality of members.

9. The molding mold according to claim 1,
    wherein the plurality of annular flow paths are partitioned by the outer flange portions and the inner flange portions.

10. The molding mold according to claim 1,
    wherein the plurality of annular flow paths are parallel with one another.

11. The molding mold according to claim 1,
    wherein the second cavity mold is configured by a plurality of members stacked in a mold-clamping direction, the plurality of members being fixed each other by a pin.

12. The molding mold according to claim 11,
    wherein the pin has a length enough to fix all of the plurality of members in the mold-clamping direction.

13. The molding mold according to claim 1,
    wherein the annular outer flange portions and the annular inner flange portions each have a vertical hole for communicating adjacent annular flow paths.

* * * * *